US009459367B2

(12) United States Patent
Ludden

(10) Patent No.: US 9,459,367 B2
(45) Date of Patent: Oct. 4, 2016

(54) CAPACITIVE SENSOR DRIVING TECHNIQUE THAT ENABLES HYBRID SENSING OR EQUALIZATION

(71) Applicant: Synaptics Incorporated, San Jose, CA (US)

(72) Inventor: Christopher A. Ludden, Pittsford, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 312 days.

(21) Appl. No.: 14/176,952

(22) Filed: Feb. 10, 2014

(65) Prior Publication Data

US 2015/0226871 A1 Aug. 13, 2015

Related U.S. Application Data

(60) Provisional application No. 61/886,011, filed on Oct. 2, 2013.

(51) Int. Cl.
*G01V 3/08* (2006.01)

(52) U.S. Cl.
CPC ...................................... *G01V 3/08* (2013.01)

(58) Field of Classification Search
CPC .... G01V 3/08; G01R 27/2605; G01R 27/26; G01R 29/26; B82Y 35/00; G01D 5/24; G01N 27/221; H03K 17/962; H03K 17/955; H03K 17/9622; G06F 3/044; G06F 3/0416; G06F 3/0412; G06F 3/0418; G06F 2203/04112; G06F 2203/04106; G06F 2203/04104; G06F 2203/04108; G06F 3/03545; G06F 3/041; G06F 2203/04103; G06F 3/03547; G06F 1/3231; G06F 3/0488; G06F 3/1446; G09G 2354/00; G09G 2370/08; G09G 3/3648; G09G 3/3655; G09G 5/003; G09G 5/12; H04N 1/00411; H04N 21/42224; G01B 2210/58; G01B 7/003; G02F 1/13338
USPC ....... 324/676, 658, 649, 600, 661, 679, 686; 345/174, 173, 179, 104, 158, 175
See application file for complete search history.

(56) References Cited

U.S. PATENT DOCUMENTS 4,087,625 A 5/1978 Dym et al.
4,233,522 A 11/1980 Grummer et al.
(Continued)

FOREIGN PATENT DOCUMENTS

CN 2436978 Y 6/2001
CN 1490713 A 4/2004
(Continued)

OTHER PUBLICATIONS

Phillippe Lambinet, Fogale nanotech, presentation materials dared, May 22, 2013, France.
(Continued)

*Primary Examiner* — Melissa Koval
*Assistant Examiner* — Nasima Monsur
(74) *Attorney, Agent, or Firm* — Patterson + Sheridan, LLP

(57) ABSTRACT

Embodiments described herein include an input device that drives an equalization signal onto an electrode that may be capacitively coupled to a sensor electrode used for capacitive sensing. The equalization signal may include a plurality of pulses that are synchronized to be out of phase with a capacitive sensing signal driven on the sensor electrode. For example, as the capacitive sensing signal transitions from a low voltage to a high voltage, the equalization signal transitions from a high voltage to a low voltage. Doing so increases the voltage difference between the electrodes and increases the slew rate of the capacitive sensing signal. In further embodiments, where the input device includes a display device, the equalization signal may be driven onto display electrodes that are used when updating a display.

21 Claims, 11 Drawing Sheets

(56) References Cited

U.S. PATENT DOCUMENTS

| | | |
|---|---|---|
| 4,237,421 A | 12/1980 | Waldron |
| 4,264,903 A | 4/1981 | Bigelow |
| 4,293,987 A | 10/1981 | Gottbreht et al. |
| 4,406,988 A * | 9/1983 | Scholz .................. H04L 25/061 327/165 |
| 4,484,026 A | 11/1984 | Thornburg |
| 4,492,958 A | 1/1985 | Minami |
| 4,550,221 A | 10/1985 | Mabusth |
| 4,550,310 A | 10/1985 | Yamaguchi et al. |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,684,504 A * | 11/1997 | Verhulst ............... G09G 3/3651 345/95 |
| 5,777,596 A | 7/1998 | Herbert |
| 5,841,078 A | 11/1998 | Miller et al. |
| 5,869,790 A | 2/1999 | Shigetaka et al. |
| 6,054,979 A | 4/2000 | Sellers |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,417,441 B2 | 8/2008 | Reynolds |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,583,092 B2 | 9/2009 | Reynolds et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002312 A1 | 1/2009 | Son |
| 2009/0002337 A1 | 1/2009 | Chang |
| 2009/0002338 A1 | 1/2009 | Kinoshita et al. |
| 2009/0009498 A1 | 1/2009 | Nishimura |
| 2009/0040191 A1 | 2/2009 | Tong et al. |

(56) References Cited

U.S. PATENT DOCUMENTS

| | | |
|---|---|---|
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0224776 A1* | 9/2009 | Keith .............. H03K 17/962 324/686 |
| 2009/0236151 A1 | 9/2009 | Yeh et al. |
| 2009/0262096 A1 | 10/2009 | Teramoto |
| 2009/0267914 A1 | 10/2009 | Dews et al. |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0207889 A1 | 8/2010 | Chen et al. |
| 2010/0214247 A1 | 8/2010 | Tang et al. |
| 2010/0220075 A1 | 9/2010 | Kuo et al. |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0292945 A1 | 11/2010 | Reynolds et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0006999 A1 | 1/2011 | Chang et al. |
| 2011/0007030 A1 | 1/2011 | Mo et al. |
| 2011/0018841 A1 | 1/2011 | Hristov |
| 2011/0022351 A1 | 1/2011 | Philipp et al. |
| 2011/0025635 A1 | 2/2011 | Lee |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1* | 3/2011 | Badaye .............. G06F 3/044 324/686 |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0122087 A1 | 5/2011 | Jang et al. |
| 2011/0141051 A1 | 6/2011 | Ryu |
| 2011/0169770 A1 | 7/2011 | Mishina et al. |
| 2011/0187666 A1 | 8/2011 | Min |
| 2011/0210940 A1* | 9/2011 | Reynolds .............. G06F 3/0418 345/174 |
| 2011/0242444 A1 | 10/2011 | Song |
| 2011/0248949 A1 | 10/2011 | Chang et al. |
| 2011/0267300 A1 | 11/2011 | Serban et al. |
| 2011/0273391 A1 | 11/2011 | Bae |
| 2011/0284949 A1 | 11/2011 | Meng et al. |
| 2011/0298746 A1 | 12/2011 | Hotelling |
| 2011/0316809 A1 | 12/2011 | Kim et al. |
| 2012/0038585 A1 | 2/2012 | Kim |
| 2012/0044171 A1 | 2/2012 | Lee et al. |
| 2012/0056820 A1 | 3/2012 | Corbridge |
| 2012/0182251 A1 | 7/2012 | Krah |
| 2012/0218199 A1 | 8/2012 | Kim et al. |
| 2012/0313901 A1 | 12/2012 | Monson |
| 2012/0319966 A1* | 12/2012 | Reynolds ................ G06F 3/041 345/173 |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2013/321296 A1 | 12/2013 | Lee et al. |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-2010136932 A1 | 12/2010 |

OTHER PUBLICATIONS

International Search Report and Written Opinion dated Aug. 30, 2013 for Application No. PCT/US2013/044815.

International Search Report; PCT/US2013/021314 dated Jun. 25, 2013.

Quantum Research Group. "Qmatrix Technology White Paper", 2006. 4 Pages.

Lubart, et al. "One Layer Optically Transparent Keyboard for Input Display", IP.com. Mar. 1, 1979. 3 Pages.

Gary L. Barrett et al. "Projected Capacitive Touch Screens", iTouchInternational. 9 pages.

Quantum Research Application Note An—KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", 16 Pages.

Ken Gilleo, "The Definitive History of the Printed Circuit", 1999 PC Fab.

Hal Philipp. "Charge Transfer Sensing", vol. 19, No. 2. 1999. pp. 96-105.

(56) References Cited

OTHER PUBLICATIONS

Paul Leopardi, "A Partition of the Unit Sphere into Regions of Equal Area and Small Diameter", 2005.
Olivier Bau, "TeslaTouch: Electrovibration for Touch Surfaces", 2010.
Colin Holland. "SID: Single Layer Technology Boosts Capacitive Touchscreens", www.eetimes.com/General. 2011.
"Novel Single Layer Touchscreen Based on Indium", 2011.
"Mesh Patterns for Capacitive Touch or Proximity Sensors", IP.com. May 14, 2010. 3pages.
"IDT Claims World's First True Single-Layer Multi-Touch Projected Capacitive Touch Screen Technology", EE Times Europe. Dec. 8, 2010.
Tracy V. Wilson et al. "How the iPhone Works", HowStuffWorks "Multi-touch Systems". 2011.
Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.
Mike Williams, "Dream Screens from Graphene", Technology Developed at Rice could Revolutionize Touch-Screen Displays. Aug. 2011.
ASIC Packaging Guidebook, Toshiba Corporation. (2000). 35 pages.
Fujitsu Microelectronics Limited. "IC Package." (2002). 10 pages.
International Search Report, PCT/US2013/021314 dated Jun. 25, 2013.
Touch Technology Brief, 3M Touch Systems, © 3M 2011, PCT Tech Brief—811.
Capacitive Touch Sensors, Fujitsu Microelectronics Europe GmbH, V4, Jan. 12, 2010.
Pushek Madaan and Priyadeep Kaur, "Capacitive Sensing Made Easy, Part 2—Design Guidelines", Apr. 2012.

* cited by examiner

CAPACITIVE SENSOR DRIVING TECHNIQUE THAT ENABLES HYBRID SENSING OR EQUALIZATION This application claims the benefit of U.S. Provisional Patent Application Ser. No. 61/886,011, filed Oct. 2, 2013.

BACKGROUND OF THE INVENTION

1. Field of the Invention

Embodiments of the present invention generally relate to capacitive sensing, and more specifically, to increasing a rate of change of a capacitive sensing signal used during capacitive sensing.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is a processing system for a capacitive sensing device. The processing system includes a first module configured to drive a first electrode with a capacitive sensing signal used for capacitive sensing where the capacitive sensing signal includes a plurality of sensing cycles linked by respective voltage transitions. The processing system also includes a second module configured to drive a second electrode with an equalization pulse during at least one of the voltage transitions. The equalization pulse is out of phase with the capacitive sensing signal such that a voltage change of the equalization pulse is opposite the at least one voltage transition and a duration of the equalization pulse is less than a duration of one of the plurality of sensing cycles.

Another embodiment described herein in an input device that includes a plurality of sensor electrodes that establish a sensing region of the input device and a processing system coupled to the plurality of sensor electrodes. The processing system is configured to drive a first electrode of the plurality of sensor electrodes with a capacitive sensing signal used for capacitive sensing where the capacitive sensing signal includes a plurality of sensing cycles linked by respective voltage transitions. The processing system is also configured to drive a second electrode with an equalization pulse during at least one of the voltage transitions. The equalization pulse is out of phase with the capacitive sensing signal such that a voltage change of the equalization pulse is opposite the at least one voltage transition, and a duration of the equalization pulse is less than a duration of one of the plurality of sensing cycles.

Another embodiment described herein is a method of performing capacitive sensing. The method includes driving a capacitive sensing signal used for capacitive sensing onto a first electrode where the capacitive sensing signal includes a plurality of sensing cycles linked by respective voltage transitions. The method includes driving an equalization pulse onto a second electrode during at least one of the voltage transitions. The equalization pulse is out of phase with the capacitive sensing signal such that a voltage change of the equalization pulse is opposite the at least one voltage transition, and a duration of the equalization pulse is less than a duration of one of the plurality of sensing cycles.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
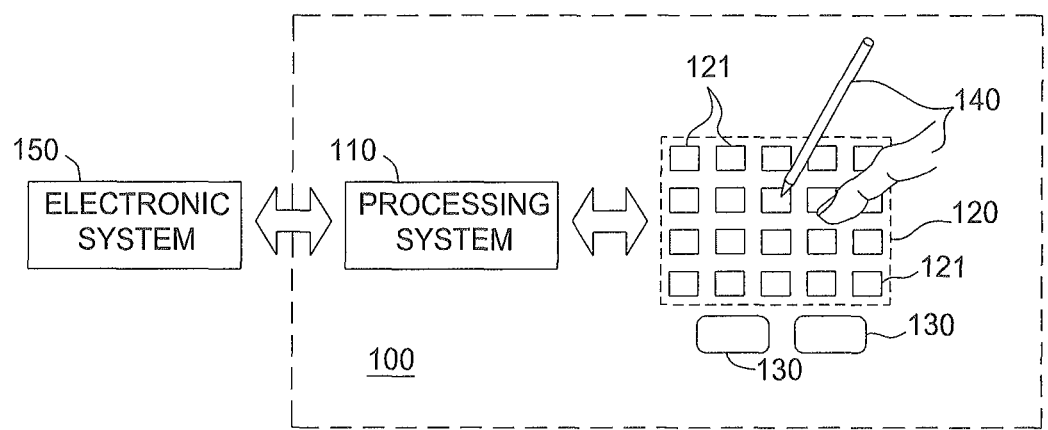
FIG. 1 is a schematic block diagram of an exemplary input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. In one embodiment, an input device may use transmitter and receiver electrodes as sensing elements to detect interaction between the input device and an input object (e.g., a stylus or a user's finger). To do so, the input device may drive a capacitive sensing signal onto one or more transmitter electrodes and, using a receiver electrode, measure a resulting signal which can be used to determine positional information of user interaction with the input device. In one embodiment, the transmitter electrode is modulated with a capacitive sensing signal where the settling time of the signal is affected by RC values associated with the transmitter electrode. Improving the settling time of the transmitter electrode may enable capacitive sensing to be performed in a shorter time or enable a broader range of frequencies to be used for capacitive sensing.

In one embodiment, to improve settling time, an equalization signal is driven onto the receiver electrode. The equalization signal may include a plurality of pulses that are synchronized to be of opposite polarity to the capacitive sensing signal edges. For example, as the capacitive sensing signal transitions from a low voltage to a high voltage, the equalization signal transitions from a high voltage to a low voltage. Doing so temporarily increases the voltage difference between the transmitter and receiver electrodes thereby increasing the rate at which the capacitance between the transmitter electrode and the receiver electrode is charged which in turn decreases the settling time of the transmitter electrode. In embodiments where the input device includes a display device, the equalization signal may also be driven onto display electrodes that are used when performing a display update. Doing so momentarily increases the voltage difference between the transmitter electrode and the display electrodes thereby increasing the rate at which the capacitances between the transmitter electrode and the display electrodes are charged which in turn further decreases the settling time of the transmitter electrode.

FIG. 1 is a block diagram of an exemplary input device 100, in accordance with embodiments of the present technology. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, behind, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field.

Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), measuring the charge transferred to or from the sensor electrodes, and determining the capacitive coupling between each sensor electrode and the input object by calculating the ratio of voltage change with the resulting measured charge transfer for each sensor electrode.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), electrowetting, MEMS, or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
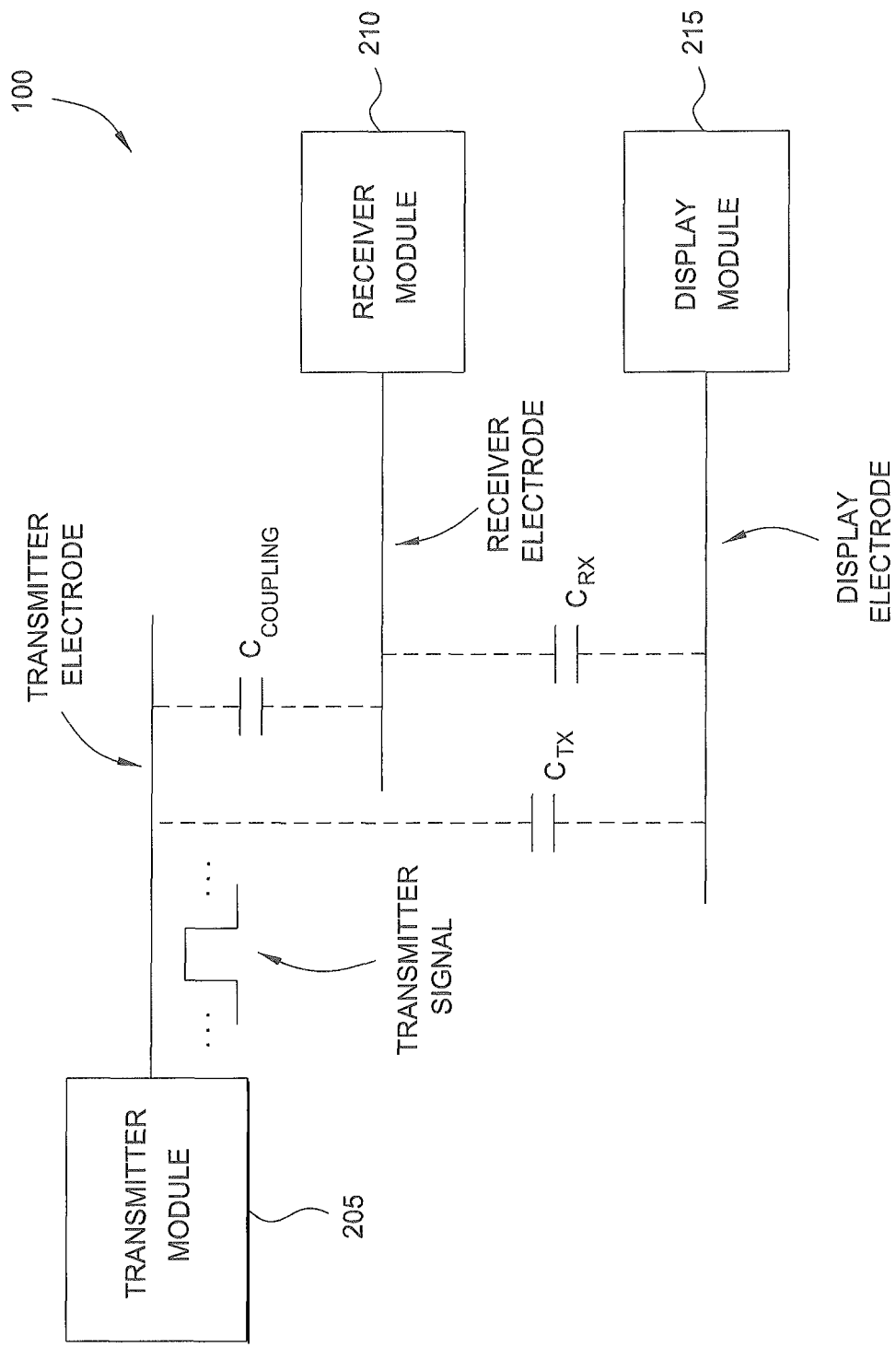
FIG. 2A illustrates a transcapacitive sensing system of the input device, according to one embodiment described herein.

FIG. 2A illustrates a transcapacitive sensing system of the input device 100, according to one embodiment described herein. The transmitter module 205 is a circuit capable of driving a capacitive sensing signal (e.g., the transmitter signal) onto a sensor electrode for performing capacitive sensing such as transcapacitive sensing. Although a square wave is shown, the transmitter signal may be any shaped modulated signal—e.g., sinusoidal, sawtooth, pulses, and the like. As described above, the transmitter signal may be used in a mutual or transcapacitive sensing method in order to detect the presence of input objects proximate to the input device 100. Because the transmitter electrode is capacitively coupled to the receiver electrode via the capacitance $C_{COUPLING}$ the resulting signal on the receiver electrode may comprise effects corresponding to the transmitter signal. The receiver module 210 (e.g., a second module) detects the resulting signal which the processing system then uses to determine positional information of the input object. In one embodiment, the receiver module 210 may hold the receiver electrode at a substantially constant voltage to facilitate receipt of the resulting signals.

In one embodiment, the input device 100 may include one or more display electrodes which are capacitively coupled to the transmitter electrode and/or receiver electrode as shown by capacitances $C_{TX}$ and $C_{RX}$. This capacitive coupling may increase the background capacitance of the transmitter and receiver electrodes. As the background capacitance increases, it may become more difficult for the processing system to detect the change in the capacitance $C_{COUPLING}$ (e.g., mutual capacitance) which provides the positional information of the input object. Moreover, the large background capacitance may increase the RC value associated with the transmitter electrode which may decrease the slew rate of the transmitter signal. Furthermore, the transmitter module 205 may be a first module while the receiver module 210 or display module 215 are a second module. As will be described below, the first module may be used to drive a capacitive sensing signal for capacitive sensing while the second module drive a second electrode with an equalization pulse during at least one of the voltage transitions in the capacitive sensing signal. Moreover, in absolute capacitive embodiments, the first module can be a first absolute capacitive sensing module while the second module is a second absolute capacitive sensing module or a display module.

In one embodiment, the transmitter module 205, receiver module 210, and display module 215 are components within the processing system 110 shown in FIG. 1. Further still, these components may be part of a single integrated circuit (IC) that performs both capacitive sensing and display updating. Alternatively, the transmitter module 205 and receiver module 210 may be located on a single IC while the display module 215 is part of a different IC in the processing system 100.

Figure 2B:
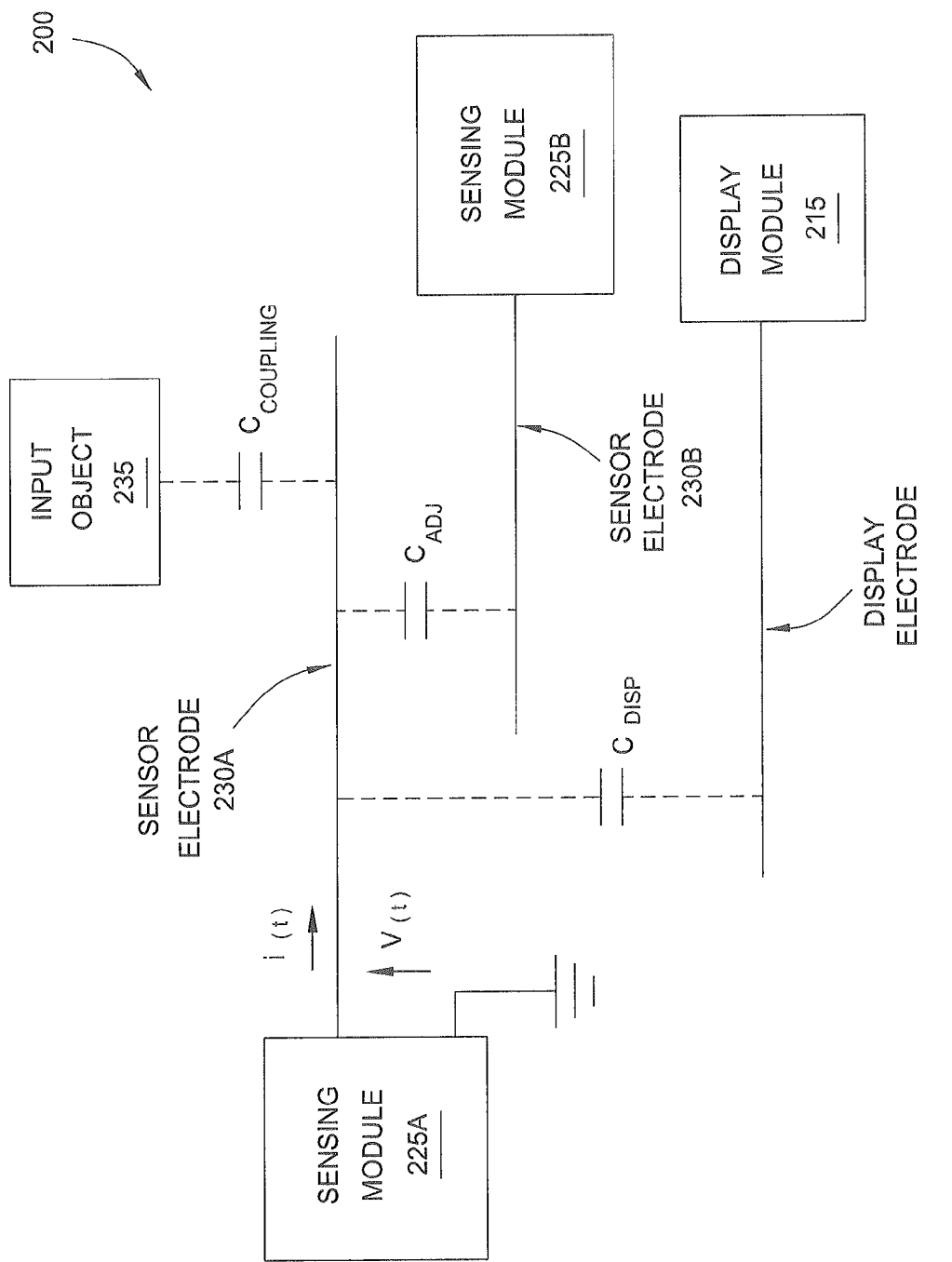
FIG. 2B illustrates an absolute capacitance sensing system of the input device, according to one embodiment described herein.

FIG. 2B illustrates an absolute capacitance sensing system of the input device 100, according to one embodiment described herein. The absolute capacitance sensing module 225A includes a circuit that drives a modulated signal (e.g., v(t)) onto the sensor electrode 230A and measures the resulting signal (e.g., i(t)) required to charge the sensor electrode 230A. The modulated signal may be any shaped modulated signal—e.g., sinusoidal, sawtooth, pulses, and the like. An input object 235 proximate to the sensor electrode 230A capacitively couples to the sensor electrode 230 through the capacitance $C_{COUPLING}$ which varies based on the size of the input object 235 and its relative position to the sensor electrode 230A. As described above, the measured current signal i(t) is used to detect the presence of the input object 235 proximate to the input device 100. As shown, sensor electrode 230A is capacitively coupled to at least one adjacent sensor electrode 230B via the capacitance $C_{ADJ}$. The sensor electrode 230B is coupled to sensing module 225B which also can be used to perform absolute capacitance sensing.

The resulting signal measured on the sensor electrode 230A may include effects corresponding to voltage changes on the adjacent sensor electrode 230B. In addition, because sensor electrode 230A is also capacitively coupled to at least one display electrode 260 via the capacitance $C_{DISP}$, the resulting signal measured on the sensor electrode 230A may also include effects corresponding to voltage changes on the display electrode.

In one embodiment, the sensing module 225A drives v(t) onto the sensor electrode 230A and measures the resulting current signal i(t) which is processed by the processing system to determine positional information of the input object 235. In another embodiment, the sensing module 225A can instead drive a modulated current i(t) onto the sensor electrode 230A and measure the resulting voltage signal v(t) which the processing system then uses to determine positional information of the input object 235. In either case, either the voltage v(t) or the current i(t) on the sensor electrode 230 varies with time and is affected by the capacitances $C_{COUPLING}$, $C_{ADJACENT}$, and $C_{DISPLAY}$.

In one embodiment, the sensor modules 225A and 225B and display module 215 are components within the processing system 110 shown in FIG. 1. Further still, these components may be part of a single integrated circuit (IC) that performs both capacitive sensing and display updating. Alternatively, the sensing modules 225A and 225B may be located on a single IC while the display module 215 is part of a different IC in the processing system 100.

Techniques for mitigating the effects of the coupling capacitance between the sensor electrodes (e.g., the transmitter and receiver electrodes used in transcapacitive sensing in FIG. 2A or the sensor electrodes used in absolute capacitive sensing in FIG. 2B) and the display electrodes will be discussed in greater detail below. Although FIGS. 2A-2B illustrates that the transmitter and receiver electrodes and sensor electrodes are different than the one or more display electrodes, in other embodiments, one or more of the transmitter electrodes, receiver electrodes, and/or sensor electrodes may themselves be display electrodes that are coupled to the display module 215 and are used to update a display. In this scenario, the transmitter electrodes, receiver electrodes, and/or sensor electrodes may include one or more electrodes shared with the display (also referred to as combination electrodes) that perform dual roles—capacitive sensing and display updating.

Equalizing a Transmitter Signal

Figure 3:
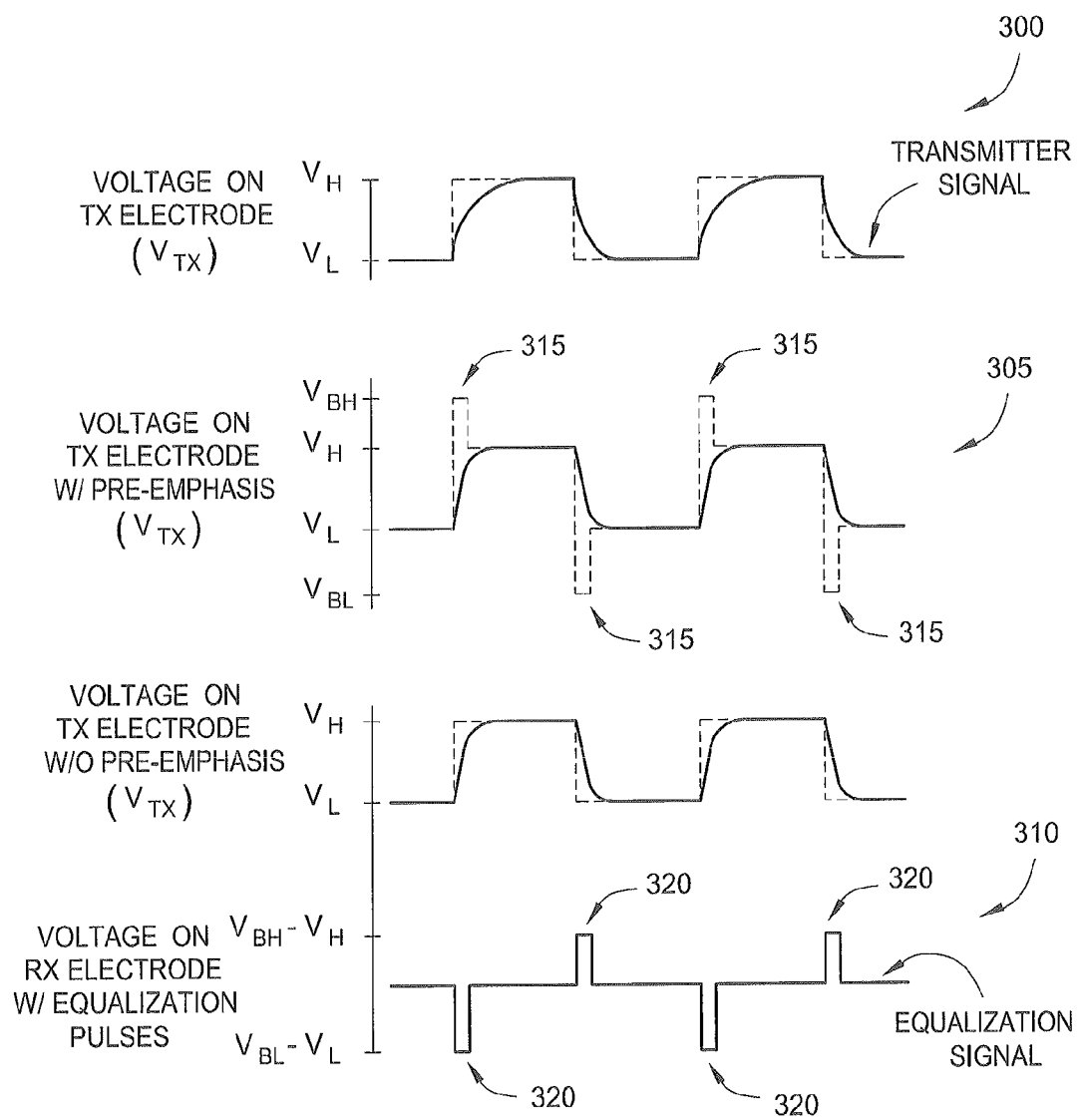
FIG. 3 includes comparative graphs of an equalization signal driven onto a receiver electrode illustrating differences in settling time, according to one embodiment described herein.

FIG. 3 includes comparative graphs of an equalization signal driven onto a receiver electrode illustrating differences in settling time, according to one embodiment described herein. Graph 300 illustrates an effect of an RC value associated with a sensor electrode on settling time. The sensor electrode may be either a transmitter electrode (as shown here) used in transcapacitive sensing or a first absolute capacitance sensing electrode used for absolute capacitive sensing. Graph 300 also includes a second electrode that may be a receiver electrode (as shown here), a second absolute capacitance sensing electrode or a display electrode. The dotted line illustrates the ideal output voltage of the transmitter module that drives the transmitter signal onto the transmitter electrode while the solid line represents that actual voltage ($V_{TX}$) on the transmitter electrode. Although the ideal signal as shown is a square wave, because of the inherent resistance and capacitance associated with the transmitter electrode and the coupling capacitances between the various other sensor/display electrodes, the transmitter signal requires time to settle as shown by the ramping voltage. As shown, the transmitter signal is divided into a plurality of sensing cycles that are linked by voltage transitions between the high and low voltages and between low and high voltages. Improving the settling time of the transmitter signal may enable capacitive sensing to be performed in a shorter time or enable a broader range of frequencies for capacitive sensing.

To reduce the settling time, the transmitter electrode may be driven with a transmitter signal that includes a pre-emphasis pulse 315. As shown in graph 305, the pre-emphasis pulse 315 may occur when the transmitter signal transitions between a high voltage ($V_H$) and a low voltage ($V_L$), or vice versa. During this transition, the transmitter module may output a boost voltage (either $V_{BH}$ or $V_{BL}$) for a short time period. This boost voltage increases the voltage ramp rate on the transmitter electrode which results in the transmitter voltage reaching the desired high and low voltages $V_H$ and $V_L$ faster than in graph 300. In one embodiment, the duration of the pre-emphasis pulse 315 may be configured such that the transmitter voltage $V_{TX}$ does not overshoot the desired high and low voltages $V_H$ and $V_L$. That is, the pre-emphasis pulse 315 may terminate when (or sometime before) the transmitter voltage $V_{TX}$ reaches the desired voltages $V_H$ and $V_L$.

Designing a transmitter module for outputting the pre-emphasis signal 315 shown by the dotted line in graph 305, however, may add cost and complexity to the input device. That is, the circuit needed to drive a signal within the ranges of $V_{BH}$ and $V_{BL}$ may be more complex and costly than the circuit needed to drive a signal between only $V_H$ and $V_L$. Instead of adding the pre-emphasis pulse 315 to the transmitter signal, the same faster settling time may be achieved by driving an equalization signal onto the receiver electrode.

Graph 310 illustrates that the equalization signal includes a plurality of equalization pulses 320 that each generate the same increase in the ramp rate of the transmitter voltage $V_{TX}$ as do the pre-emphasis pulses in graph 305. Stated differently, the boost voltage (i.e., $V_{BH}$–$V_H$ and $V_{BL}$–$V_L$) may be applied on the receiver electrode as the equalization pulse 320 to replace the pre-emphasis pulse 315. For example, assume that that $V_{BH}$ is 8V, $V_H$ is 4V, $V_L$ is –4V, and $V_{BL}$ is –8V. To output the pre-emphasis pulse 315, the transmitter module driving the transmitter signal must be able to output voltages between 8V to –8V. However, the same increase in settling time may be obtained if the receiver module coupled to the receiver electrode outputs during the equalization pulses 320 either 4V or –4V (assuming the receiver electrode is biased at 0V). Thus, the transmitter modules attached to the transmitter electrode may be designed to drive voltages within a smaller range than the transmitter modules used to output the pre-emphasis pulse 315 in graph 305. One advantage of using a smaller voltage range is that doing so reduces the likelihood the sensing voltages will affect the components in the display relative to using a larger range of voltages. Although graph 310 illustrates driving equalization pulses 320 when the transmitter voltage transitions from low to high or high to low, the equalization pulse 320 may be applied to only one of these transitions (e.g., only when the transmitter signal transitions from low to high).

Furthermore, graph 310 illustrates that the equalization signal is synchronous with the transmitter signal. That is, each time the transmitter signal transitions, the input device drives an equalization pulse 320 in the opposite direction on the receiver electrode. Accordingly, the equalization signal is out of phase with the transmitter signal. Synchronizing the signals such that they are out of phase increases the voltage difference across the coupling capacitance $C_{COUPLING}$ between the transmitter and receiver electrodes which increases the ramp rate of the transmitter signal. Of course, the ramp rate may be increased further if the amplitude of the equalization pulses 320 are further increased.

The net change in charge during a sensing cycle caused by the equalization pulse 320 is zero. Graph 310 illustrates that during a sensing cycle of the transmitter signal (i.e., the period between the voltage transitions of the transmitter signal) the equalization signal increases to a maximum (or minimum) voltage but then returns to the constant voltage. Whatever charge is induced by the change in the equalization pulse 320 from the constant voltage to the maximum (or minimum) voltage is then compensated for when the pulse returns to the constant voltage.

Although FIG. 3 illustrates driving the equalization signal onto a receiver electrode, in other embodiments, the equalization signal may be driven on, for example, a display electrode (e.g., a source or gate lines). Furthermore, during absolute capacitive sensing, the equalization signal may be driven on another sensor electrode or a display electrode. Driving the equalization signal onto the display electrodes, or combinations of sensor electrodes and display electrodes, will be discussed in more detail below.

Figure 4A:
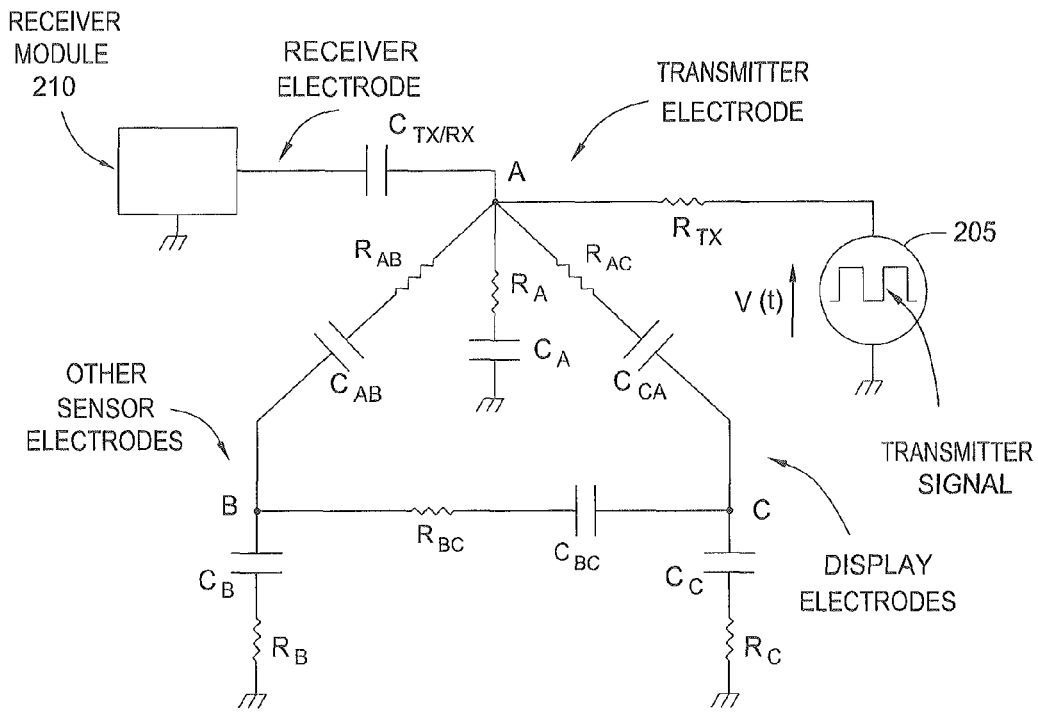
FIGS. 4A-4E illustrate various RC networks in input devices, according to embodiments described herein.

FIGS. 4A-4E illustrate various RC networks in input devices, according to embodiments described herein. FIG. 4A illustrates the various capacitances that may exist in the input device. As shown, there are six capacitances and three resistances illustrated in this four-node network including nodes "A", "B", "C" and GND (also referred to as "GND" and shown as the standard symbol).

As shown in FIGS. 4A-4D, node A is used as a transmitter electrode, while node B represents adjacent sensor electrodes (receiver electrodes and/or other transmitter electrodes) and node C represents adjacent display electrodes. Nodes A and B, respectively, have inherent capacitances $C_A$ and $C_B$ and resistances $R_A$ and $R_B$. For example, the capacitance $C_{AB}$ may represent the coupling capacitance (or the mutual capacitance) between the transmitter electrode and other sensor electrodes shown in FIG. 2 while node C may represent any other electrode (e.g., display electrodes) in the input device which is substantially proximate to node A and node B such that the electrode is capacitively coupled by capacitances $C_{CA}$ and $C_{BC}$ to these nodes. For example, nodes A, B, and C may also all be display electrodes that are used when updating a display. Specifically, nodes A and B may represent common electrodes that are used as both display electrodes and sensor electrodes. Alternatively, nodes A may represent a discrete sensor electrode that is not used as a display electrode while node B represents an electrode that is used both for capacitive sensing (e.g., a sensor electrode) and display updating (e.g., Vcom line, source line, gate line, etc.). Regardless of whether the sensor electrodes represented by nodes A and B are discrete sensor electrodes or are used when updating the display, these electrodes may be proximate to node C such that coupling capacitances $C_{CA}$ and $C_{BC}$ exist.

During mutual or transcapacitive sensing, the changes in capacitance $C_{TX/RX}$ between the transmitter and receiver electrodes due to a proximate input object is measured by driving the transmitter signal onto the transmitter electrode and measuring the resulting signals received with the receiver electrode using the receiver module 210. By measuring the resulting signals, the position of the input object may be determined. However, the capacitances $C_A$, $C_{CA}$, $C_B$, $C_{BC}$ and/or $C_C$ may have several deleterious effects. For example, the total capacitance of the transmitter electrode to ground is increased thereby increasing the settling time of the transmitter electrode. Likewise, the various resistances in FIG. 4A may also affect the setting time of the transmitter (i.e., increase the total RC value affecting the transmitter signal).

Figure 4B:
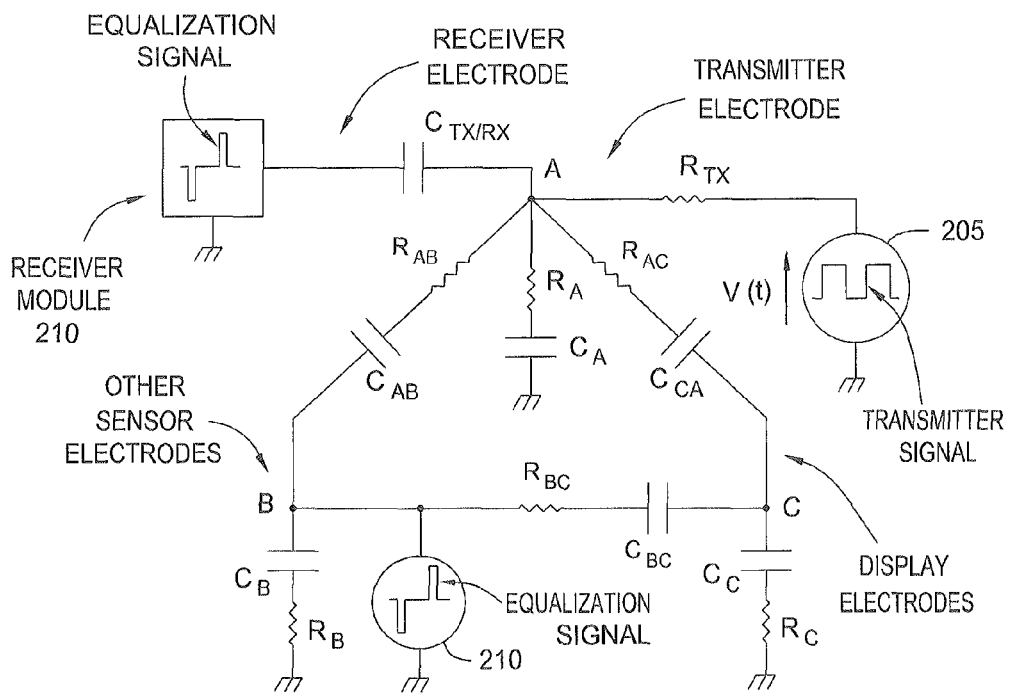

FIG. 4B illustrates driving the equalization signal onto the receiver electrode and/or other sensor electrodes at node B to improve the settling time of the transmitter signal. To do so, a receiver module 210 coupled to the receiver electrode and receiver modules 210 connected to the sensor electrodes at node B drive the equalization signal onto the respective electrodes. In another embodiment, a transmitter module 205 may instead be used to drive the equalization signal onto the other sensor electrodes at node B. Driving the equalization signal onto the various electrodes may improve the settling time of the transmitter signal at node A and compensate for deleterious effects of the resistances and capacitances. Specifically, with reference to graph 310 illustrated in FIG. 3, the transmitter signal and the equalization signal can be synchronized such that the equalization signal is out of phase with the transmitter signal thereby increasing the voltage difference between node A and node B when the transmitter signal transitions. Doing so increases the slew rate and improves settling time of the transmitter signal.

Figure 4C:
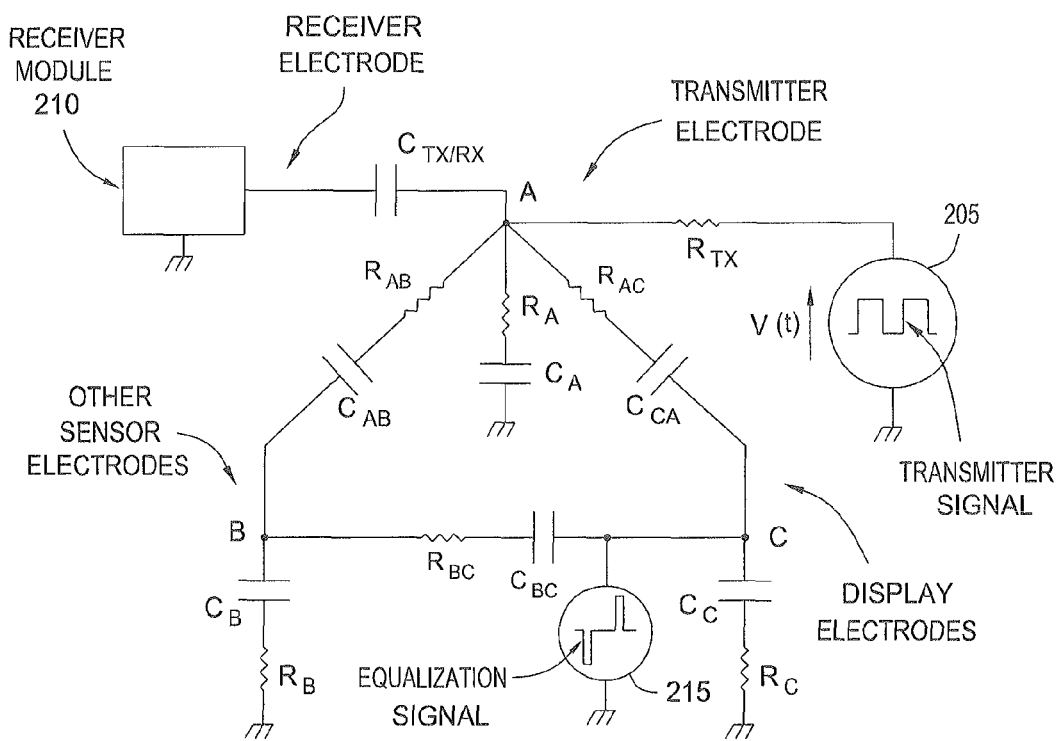

FIG. 4C illustrates driving the equalization signal onto one or more display electrodes at node C. To do so, the display module 215 drives the equalization signal onto the display electrodes. This may improve the settling time of the transmitter signal at node A and compensate for deleterious effects of the resistances and capacitances. Specifically, with reference to graph 310 illustrated in FIG. 3, the transmitter signal and the equalization signal can be synchronized such that the equalization signal is out of phase with the transmitter signal thereby increasing the voltage difference between node A and node C when the transmitter signal transitions. Doing so increases the slew rate and improves settling time of the transmitter signal.

Figure 4D:
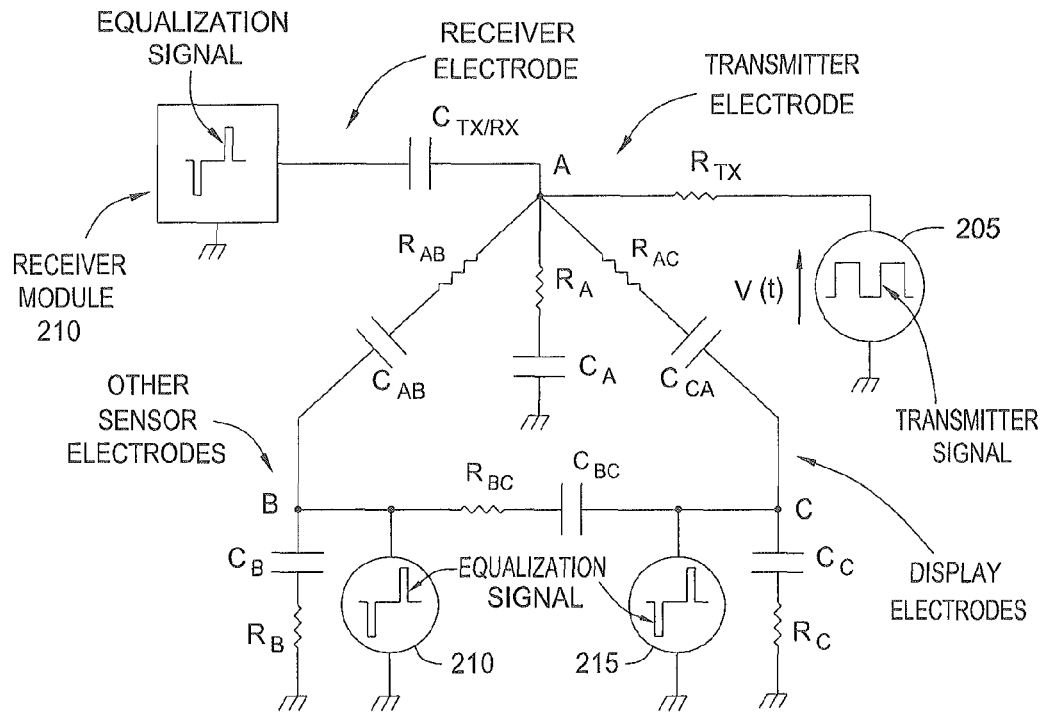

FIG. 4D illustrates another embodiment where the equalization signal is driven onto both node B and node C. In addition to driving the equalization on the receiver electrode coupled to receiver module 210, other receiver modules or transmitter modules may be used to drive the equalization signal onto the other sensor electrodes at node B and on the receiver electrode while the display module 215 may be used to drive the equalization signal onto one or more display electrodes at node C. As when driving the equalization signal only on the sensor electrodes as shown in FIG. 4B, also driving the equalization signal onto node C momentarily increases the voltage difference between the transmitter electrode and the display electrode, and thus, further improves the slew rate of the transmitter signal. This may allow more measurements per unit of time and may increase the maximum frequency of the modulated signal or transmitter signal which improves the signal to noise ratio.

In another embodiment, instead of directly driving the equalization signal onto node C, node C may be left in an electrically floating state. Using the coupling capacitance $C_{BC}$, the equalization signal driven onto node B capacitively couples into node C, especially when $C_{BC}$ is much greater than $C_C$, which may provide the advantages discussed above. Conversely, in another example, the input device may directly drive the equalization signal onto node C using the display module 215, especially when $C_{BC}$ is much greater than $C_B$, and thus indirectly drive the equalization signal on node B which is electrically floated.

Figure 4E:
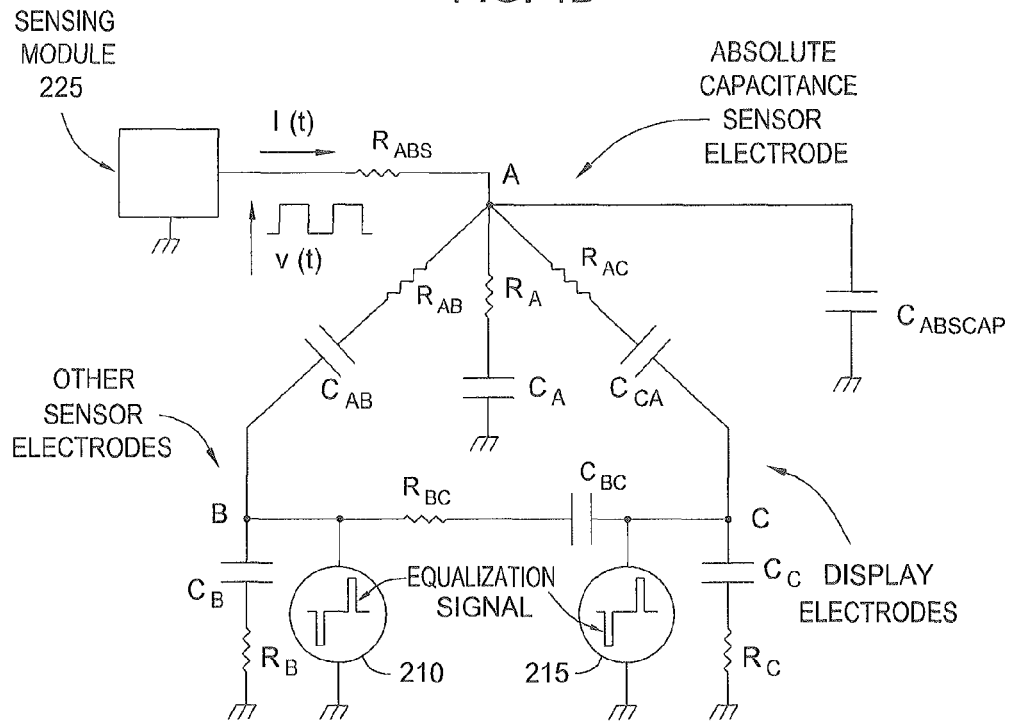

FIG. 4E illustrates an embodiment where node A is an absolute capacitance electrode. The equalization signal may be applied to node B, to node C or to both nodes B and C in order to provide the advantages discussed above.

In one embodiment of a display device, there are typically three electrodes per pixel, for example: Vcom electrode (common electrode(s)), gate electrodes (gate lines) and source electrodes (source lines). As will be discussed in more detail below, in various embodiments, any of these electrodes may be configured as a sensor electrode for transcapacitive or absolute capacitive sensing (or both). While the following discussion describes an embodiment where the display electrodes correspond to a single sub-pixel, a similar discussion may be extended to an aggregated group of sub-pixels. Further, the capacitances and resistances associated with a sensor electrode may also include the capacitances and resistances of the associated wiring or other routing.

Figure 5:
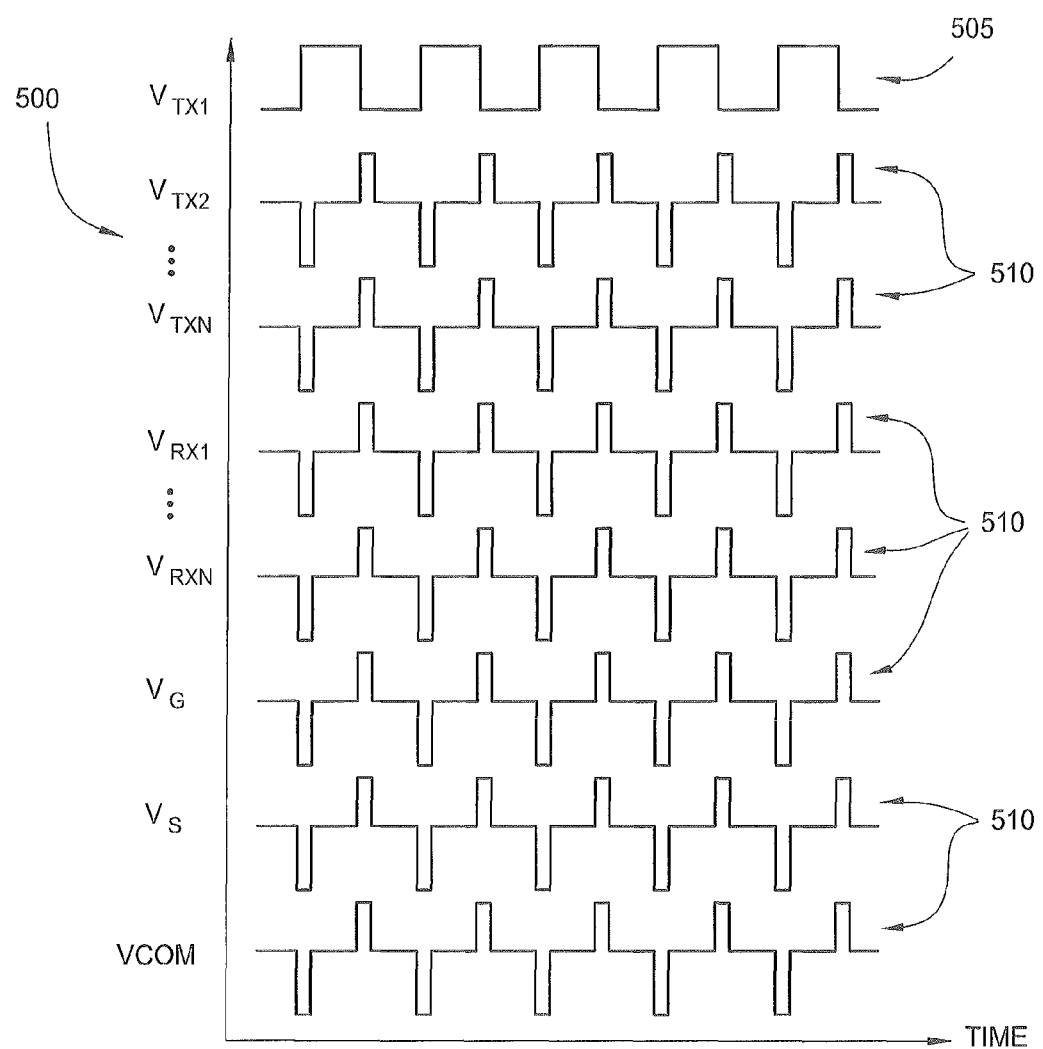
FIG. 5 illustrates driving equalization signal onto sensor and display electrodes, according to one embodiment described herein.

FIG. 5 illustrates driving an equalization signal onto sensor and display electrodes, according to one embodiment described herein. Specifically, chart 500 illustrates the waveforms of the signals that may be at nodes A, B, and C in the circuit model shown in FIG. 4C. The first transmitter electrode at node A is driven with the transmitter signal 500 (e.g., $V_{TX1}$). For clarity, the voltages shown in chart 500 are ideal voltages where the effects of the RC values associated with the electrodes are ignored.

In addition to driving the transmitter signal onto one of the transmitter electrodes, the transmitter modules may drive the equalization signal 510 onto the other transmitter electrodes as shown by voltages $V_{TX2}$-$V_{TXN}$. That is, the input device may drive the equalization signal 510 on all the transmitter signals that are not currently being used to perform capacitive sensing. Alternatively, the other transmitter electrodes may be left in a floating state, allowing then to be indirectly driven with an equalization signal that is applied to other adjacent sensor and/or display electrodes that are capacitively coupled to these transmitter electrodes.

Chart 500 further illustrates driving the equalization signal 510 (which includes a plurality of pulses 520 synchronous with the transitions in the transmitter signal 505) onto at least one of the receiver electrodes at node B. Although the receiver voltages $V_{RX1-N}$ illustrate performing equalization pulses 520 for both transitions in the transmitter signal 505, in one embodiment, the pulses 520 may be applied synchronous to only one of the transitions—e.g., either from low to high or high to low. Furthermore, although chart 500 illustrates using the equalization signal 510 on all the receiver electrodes, in other embodiments the signal 510 may be driven onto only select receiver electrodes. For instance, some receiver electrodes may be too far from the transmitter electrode that is currently being driven with the transmitter signal to be capacitively coupled. In this case, the receiver electrode may be instead be floated, held to a substantially constant voltage, or be driven with a guarding signal that is based on the transmitter signal 505.

In addition to driving the equalization signal 510 onto sensor electrodes, the input device may also drive the equalization signal 510 onto display electrodes. Specifically, the display module may drive the equalization signal 505 onto gate lines, sources lines, or Vcom electrodes (e.g., node C in FIG. 4C). Because these display electrodes may be in close proximity to the receiver and/or transmitter electrodes, as described above, driving the equalization signal 510 onto the display electrodes may remove the effects of parasitic capacitances. Moreover, although chart 500 illustrates the sensor electrodes being distinct from the display electrodes, this is not a requirement. For example, the receiver and/or transmitter electrodes may include one or more shared electrodes that are used during both capacitive sensing and display updating. In one nonlimiting example, the receiver electrodes may include a plurality of the Vcom electrodes that are used when updating a display. Although Vcom electrodes are specifically mentioned, the gate and source lines may also be used as sensor electrodes for performing capacitive sensing.

Although FIG. 5 illustrates driving the equalization pulses on the sensor electrodes and the display electrodes, this is not a requirement. For example, the equalization pulses may be driven on one or more of the display electrodes but not the receiver electrodes, or vice versa. Moreover, the processing system may drive the pulses only on a subset of the display electrodes (e.g., only the source lines).

In other embodiments, a guarding signal may be driven onto the display electrodes in the display screen of the display device rather than the equalization signal. That is, driving the equalization signal onto the sensor and display electrodes may be used in combination or in place of driving the guarding signal onto these electrodes. For example, the equalization signal may be driven on one or more sensor electrodes while the guarding signal is driven on the display electrodes, or vice versa.

Transmitting the guarding signal on any conductive material that may capacitively couple with the transmitter electrode may reduce the RC constant and thus reduce the settling time. To do so, the input device may use a guarding signal that has the same characteristics as the transmitter signal 805—i.e., similar phase, amplitude, and frequency.

Figure 6:
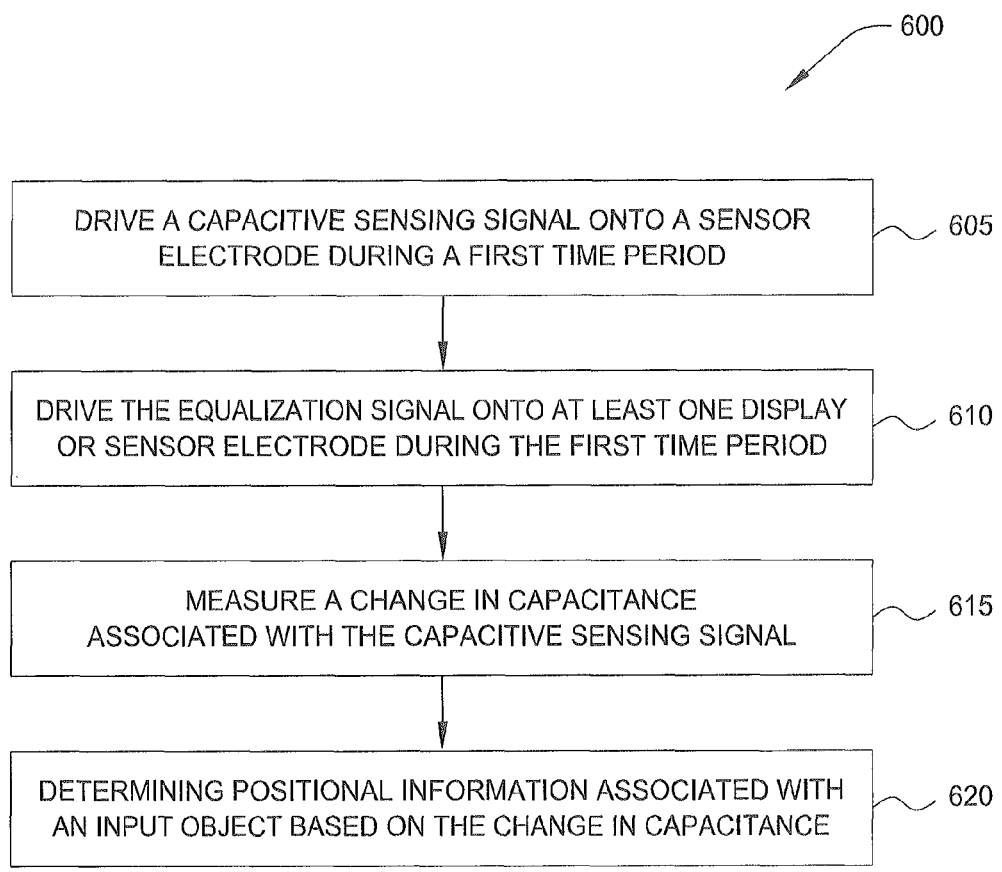
FIG. 6 is a flowchart illustrating a technique for driving an equalization signal onto a receiver electrode, according to one embodiment described herein.

FIG. 6 is a flowchart illustrating a method 600 for driving an equalization signal onto a sensor or display electrode, according to one embodiment described herein. At block 605, the input device drives a transmitter or modulated signal (e.g., examples of capacitive sensing signals) onto a sensor electrode. In one embodiment, the input device performs a mutual or transcapacitive sensing technique to identify a change in capacitance between the transmitter electrode and one or more receiver electrodes. Alternatively, the input device may perform absolute capacitive sensing to determine a change in capacitance between a sensor electrode and ground.

At block 610, the receiver or display module drives an equalization signal onto an associated electrode during a time period that at least overlaps with a time during which the transmitter or modulated signal is driven. In one embodiment, the equalization signal is driven on one or more sensor electrodes, on one or more display electrodes, or any combination thereof. In one embodiment, the equalization pulse is only applied during a portion of the sensing period. For example, the pulse may only be applied during a first portion of sensing period immediately following a voltage transition in the transmitter or modulated signal.

Referring back to FIG. 5 above, the equalization signal may be synchronized with the transmitter or modulated signal such that the pulses of the equalization signal substantially align with one of the transitions in this signal. More specifically, the equalization signal may be out of phase with the transmitter or modulated signal such that when this signal transitions from a low voltage to a high voltage or from a high voltage to a low voltage, the equalization signal does the opposite, thereby increasing the voltage difference between the respective electrodes. This voltage difference increases the slew rate of the sensor electrode and improves settling time.

At block 615, the input device may measure a change in capacitance associated with the transmitter or modulated signal. At block 620, the processing system determines the positional information of the input object based on the change in capacitance. For example, when a human finger comes into close proximity of the sensor electrode driven with the transmitter or modulated signal, the finger changes the associated capacitance.

Example Sensor Electrode Arrangements

Figure 7:
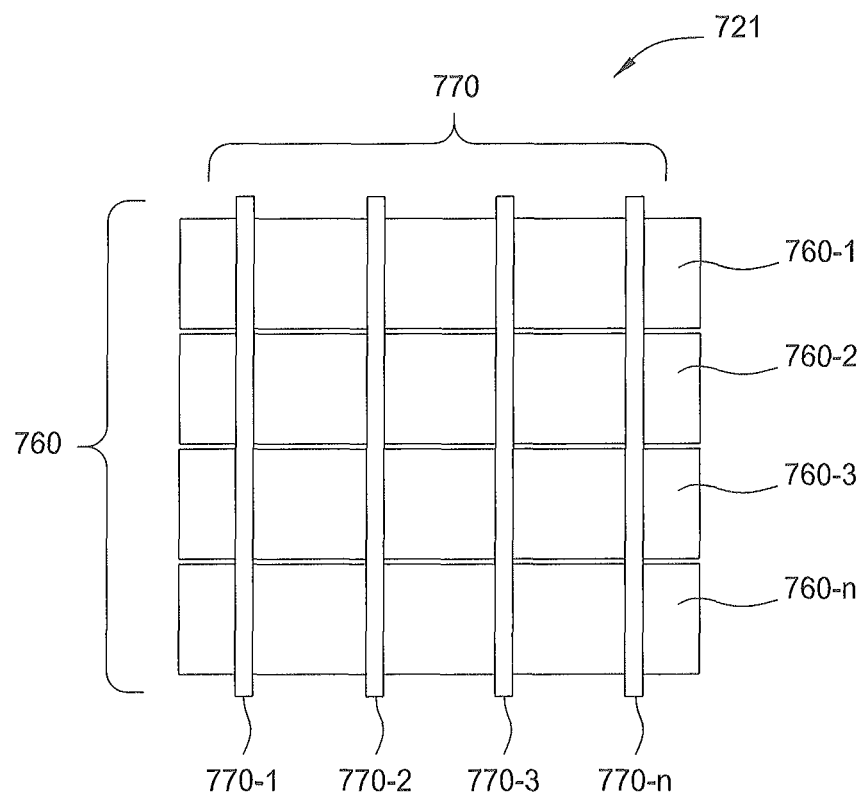
FIG. 7 illustrates a plan view of a sensor assembly that may be used in the input device to sense the input object, according to an embodiment described herein.

FIG. 7 illustrates a plan view of a sensor assembly that may be used in the input device to sense the input object, according to an embodiment described herein. Specifically, FIG. 7 shows a portion of an exemplary pattern of sensor electrodes 721 in a sensing region. For clarity of illustration and description, FIG. 7 shows the sensor electrodes 721 in a pattern of simple rectangles, and does not show various components. This pattern of sensor electrodes 721 comprises a first plurality of sensor electrodes 760 (760-1, 760-2, 760-3, . . . 760-n), and a second plurality of sensor electrodes 770 (770-1, 770-2, 770-3, . . . 770-n) disposed over the plurality of sensor electrodes 760. In one embodiment, this pattern of sensor electrodes 721 comprises a plurality of transmitter electrodes 760 (760-1, 760-2, 760-3, . . . 760-n), and a plurality of receiver electrodes 770 (770-1, 770-2, 770-3, . . . 770-n) disposed over the plurality of transmitter electrodes 760 to perform transcapacitive sensing. In another embodiment, the first plurality of sensor electrodes may be configured to transmit and receive and the second plurality of sensor electrodes may also be configured to transmit and receive to perform absolute capacitive sensing.

In one embodiment, the first and second pluralities of electrodes 760, 770 may be arranged on different sides of the same substrate. For example, each of the electrode(s) may extend longitudinally across one of the surfaces of the substrate. Further still, on one side of the substrate, the sensor electrodes 760 may extend in a first direction, but on the other side of the substrate, the sensor electrodes 770 may extend in a second direction that is either parallel with, or perpendicular to, the first direction. As shown here, the sensor electrodes 721 are shaped as bars or stripes where the sensor electrodes 760 on one side of the substrate extend in a direction perpendicular to the sensor electrodes 770 on the opposite side of the substrate.

However, the sensor electrodes 721 may be formed into any desired shape on the sides of the substrate. Moreover, the size and/or shape of the sensor electrodes 721 on one side of the substrate may be different than the size and/or size of the electrodes 721 on another side of the substrate. Additionally, the sensor electrodes 721 on the same side may have different shapes and sizes.

In another embodiment, the sensor electrodes 721 may be formed on different substrates that are then laminated together. In one example, the sensor electrodes 760 may be disposed on one of the substrate while the sensor electrodes 770 are disposed on the other substrate. In one embodiment, the sensor electrodes 760 may be larger (larger surface area) than the sensor electrodes 770, although this is not a requirement. In other embodiments, the sensor electrodes 760, 770 may have a similar size and/or shape. Thus, the size and/or shape of the sensor electrodes 721 on one of the substrates may be different than the size and/or size of the electrodes 721 on the other substrate. Nonetheless, the sensor electrodes 721 may be formed into any desired shape on their respective substrates. Additionally, the sensor electrodes 721 on the same substrate may have different shapes and sizes.

As discussed above, the equalization signal may be driven on the sensor electrodes 770 to increase the slew rate of the capacitive sensing signal on the sensor electrodes 760. Moreover, the equalization signal may also be driven onto the sensor electrodes 760 currently not carrying the capacitive sensing signal. For example, assume that the input device is currently driving the capacitive sensing signal onto sensor electrode 760-1 and the equalization signal on all the sensor electrodes 770. Because of the bars and stripes arrangement, the sensor electrodes 770 cross over all the other sensor electrodes 760 in the sensing region. To prevent the need to charge the parasitic capacitance between the sensor electrodes 760 currently not carrying the capacitive sensing signal and the sensor electrodes 770, the equalization signal may be driven onto the unused sensor electrodes.

In yet another embodiment, all of the sensor electrodes are disposed as islands on the same surface. Jumpers are used to connect the islands into rows and into columns, such that the transmitter (or receiver) electrodes effectively cross over the receiver (or transmitter) electrodes.

Figure 8A:
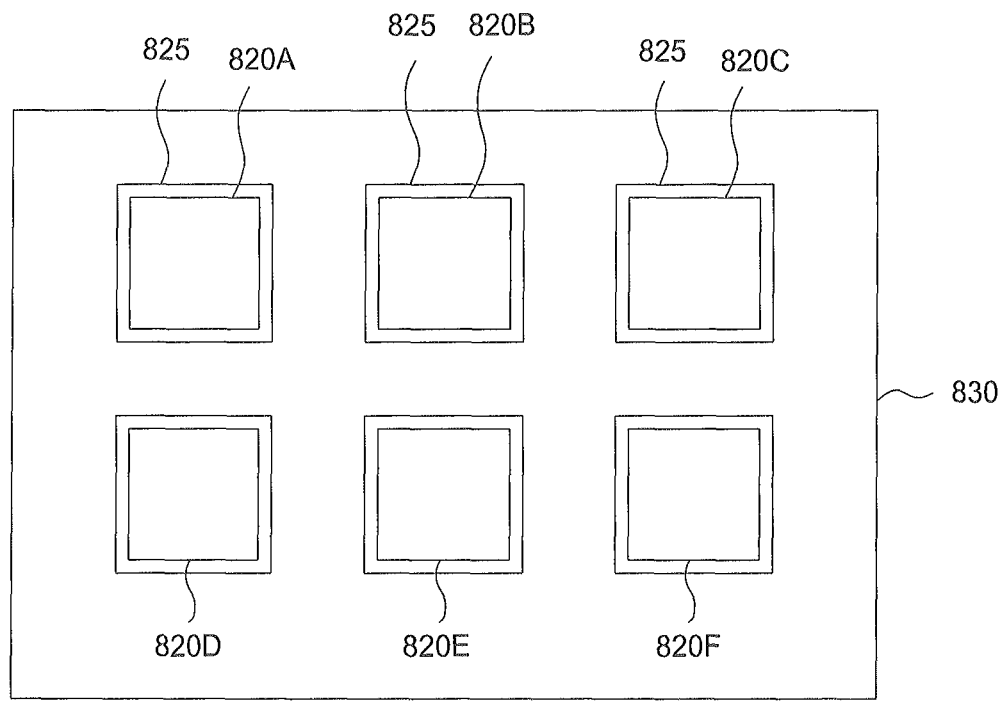
FIGS. 8A-8B illustrate matrix array sensor assemblies that may be used in the input device to sense the input object, according to embodiments described herein.
Figure 8B:
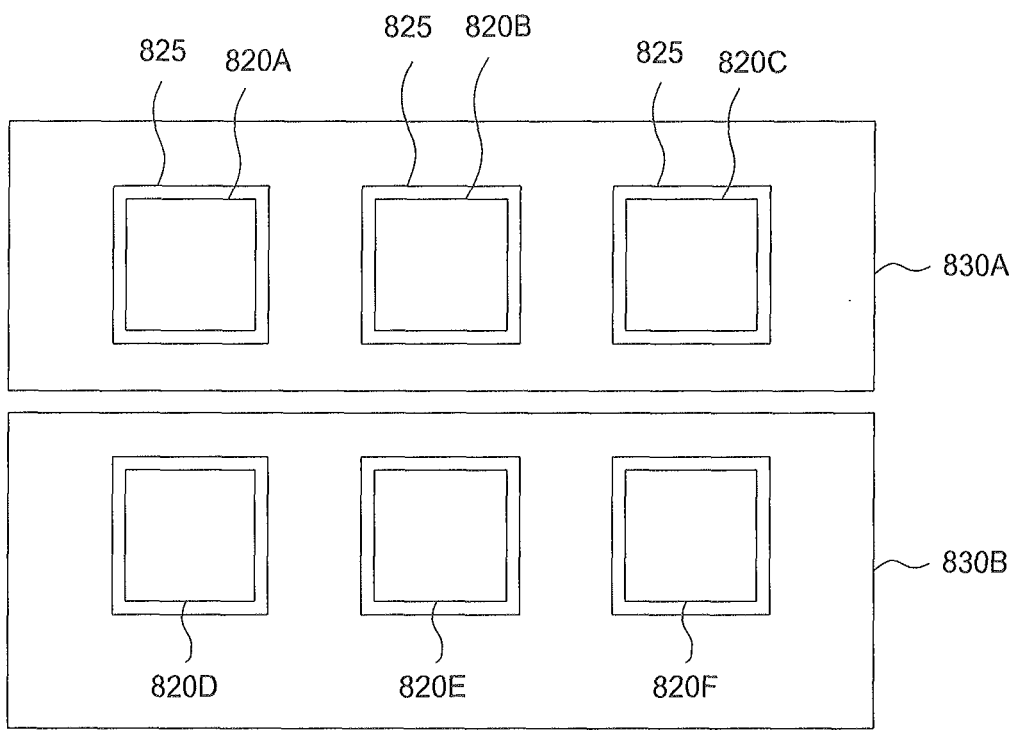

FIG. 8A-8B illustrate matrix array sensor assemblies that may be used in the input device to sense the input object, according to embodiments described herein. In FIGS. 8A and 8B, the sensor electrodes 820 are all located on the same side or surface of a common substrate. In such embodiments, the sensor electrodes 820 are electrically isolated from each other—e.g., by insulator or gap 825. In one embodiment, the electrodes 820 are disposed in a matrix array where each sensor electrode 820 is substantially the same size and/or shape. In such embodiment, the sensor electrodes 820 may be referred to as a matrix sensor electrode as shown in FIGS. 8A and 8B. In one embodiment, one or more of the sensor electrodes 820 of the matrix array may vary in at least one of size and shape. Each sensor electrode 820 of the matrix array may correspond to a pixel of the capacitive image.

In one embodiment, the processing system is configured to drive the sensor electrodes 820 with a modulated signal to determine changes in absolute capacitance. Alternatively or additionally, the processing system is configured to drive at least one sensor electrodes 820 with transmitter signal to determine changes in mutual capacitance between two of the sensor electrodes 820 (e.g., between electrode 820A and 820B). For example, processing system may be configured to drive a transmitter signal onto a first one of the sensor electrodes 820 and receive a resulting signal with a second one of the sensor electrodes 820 while the equalization signal is driven onto the second sensor electrode 820. The transmitter signal(s) and modulated signal(s) may be similar in at least one of shape, amplitude, frequency and phase. In various embodiments, the transmitter signal(s) and modulated signal(s) are the same signal. Further, the transmitter signal is a modulated signal that is used for transcapacitive sensing.

As shown, one or more grid electrodes 830 may be disposed on the common substrate between the sensor electrodes 820. In one example, the grid electrode 830 is used to shield and/or guard the sensor electrodes 820. Alternatively, the grid electrode 830 may be used as a sensor electrode for performing capacitive sensing. For example, the grid electrode 830 may be used as a transmitter electrode while the sensor electrodes 820 are receiver electrodes, or vice versa. In one embodiment, however, the matrix array assembly in FIG. 8A may not have the grid electrodes 830 but only include the sensor electrodes 820.

FIG. 8B illustrates a grid electrode divided into segments 830A and 830B which may provide more granular control of the sensing region. For example, the transmitter signal may be transmitted on segment 830A while the resulting signal is sensed using electrodes 820A-C. During the next capacitive sensing cycle, the input device may drive the transmitter signal on segment 830B and measure the mutual capacitance between electrodes 820D-F and segment 830B.

In any of the proceeding embodiments, the input device may transmit the equalization pulse onto the sensor or grid electrode being used to receive the resulting signal. Moreover, the equalization signal may also be driven onto the unused transmitter electrodes. For example, if the grid electrode 830A is currently carrying the transmitter signal, the input device may drive the equalization signal onto the other grid electrode 830B to improve the settling time of grid electrode 830A.

In any of the sensor electrode arrangements discussed in FIGS. 7 and 8A-8B, the sensor electrodes and/or grid electrode(s) may be formed on a substrate that is external to the display device. For example, the electrodes and/or grid electrode(s) may be disposed on the outer surface of a lens in the input device. In other embodiments, the sensor electrodes and/or grid electrode(s) are disposed between the color filter glass of the display device and the lens of the input device. In other embodiments, at least a portion of the sensor electrodes and/or grid electrode(s) may be disposed such that they are between a Thin Film Transistor substrate (TFT substrate) and the color filter glass of the display device. In one embodiment, a first plurality of sensor electrodes and/or grid electrode(s) are disposed between the TFT substrate and color filter glass of the display device and the second plurality of sensor electrodes and/or a second grid electrode(s) are disposed between the color filter glass and the lens of the input device. In yet other embodiments, all of sensor electrodes and/or grid electrode(s) are disposed between the TFT substrate and color filter glass of the display device, where the sensor electrodes may be disposed on the same substrate or on different substrates as described above.

In one or more embodiments, at least a first plurality of the sensor electrodes includes one or more display electrodes of the display device that are used in updating the display. For example, the sensor electrodes may comprise combination electrodes such as one or more segments of a Vcom electrode, a source drive line, a gate line, an anode sub-pixel electrode or a cathode pixel electrode, or any other display element or group thereof. These combination electrodes may be disposed on an appropriate display screen substrate. For example, the combination electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the electrode is referred to as a "combination electrode", since it performs multiple functions. In various embodiments, each of the sensor electrodes comprises one or more combination electrodes associated with a pixel or sub pixel. In other embodiments, at least two sensor electrodes may share at least one common electrode associated with a pixel or sub-pixel. While the first plurality of sensor electrodes may comprise one or more combination electrodes configured for display updating and capacitive sensing, the second plurality of sensor electrodes may be configured for capacitive sensing and not for display updating. Further, in one or more embodiments, the grid electrode comprises one or more combination electrodes.

Alternatively, all of the sensor electrodes may be disposed between the TFT substrate and the color filter glass of the display device. In one embodiment, a first plurality of sensor electrodes are disposed on the TFT substrate, each comprising one or more common electrodes and a second plurality of sensor electrodes may be disposed between the color filter glass and the TFT substrate. Specifically, the receiver electrodes may be part of a black mask on the color filter glass. In another embodiment, all of the sensor electrodes comprise one or more combination electrodes. The sensor electrodes may be located entirely on the TFT substrate or the color filter glass as an array of electrodes. As discussed above, some of the sensor electrodes may be coupled together in the array using jumpers or all the electrodes may be electrically isolated in the array and use grid electrodes to shield or guard the sensor electrodes. In one more embodiments, the grid electrode, when present, comprises one or more common electrodes.

In any of the sensor electrode arrangements described above, the sensor electrodes may be operated in the input device in the transcapacitive mode by dividing the sensor electrodes into transmitter and receiver electrodes or in the absolute capacitive sensing mode, or some mixture of both.

CONCLUSION

The input device described above may use transmitter and resulting signals to detect interaction between the input device and an input object (e.g., a stylus or a user's finger). In one embodiment, the transmitter signal is modulated and its slew rate is affected by the RC values in the input device. Improving the settling time of the transmitter signal may enable capacitive sensing to be performed in a shorter time or enable a broader range of frequencies for capacitive sensing.

In one embodiment, to improve settling time, an equalization signal is driven onto the receiver electrode. The equalization signal may include a plurality of pulses that are synchronized to be out of phase with the transmitter signal. For example, as the transmitter signal transitions from a low voltage to a high voltage, the equalization signal transitions from a high voltage to a low voltage. Doing so increases the voltage difference between the transmitter and receiver electrodes thereby improving the slew rate and settling time of the transmitter signal. In embodiments where the input device includes a display device, the equalization signal may also be driven onto display electrodes that are used when performing a display update.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:
1. A processing system for a capacitive sensing device, the processing system comprising:
    a first module for the capacitive sensing device, wherein the first module is configured to drive a first electrode with a capacitive sensing signal comprising a plurality of sensing cycles linked by respective voltage transitions; and a second module for the capacitive sensing device,
wherein the second module is configured to drive a second electrode with an equalization pulse during at least one of the voltage transitions, wherein the first electrode is capacitively coupled to the second electrode via the capacitance; wherein the second electrode is configured to perform at least one of capacitive sensing and display updating and is capacitively coupled to the first electrode, wherein the equalization pulse is out of phase with the capacitive sensing signal such that a voltage change of the equalization pulse is opposite the at least one voltage transition, and wherein a duration of the equalization pulse is less than a duration of one of the plurality of sensing cycles.

2. The processing system of claim 1, wherein the second module is a receiver module configured to receive a resulting signal used for capacitive sensing via the second electrode, the resulting signal is based on, at least in part, the capacitive sensing signal driven on the first electrode.

3. The processing system of claim 1, wherein the first module is configured to measure a change in capacitance between the first electrode and earth ground.

4. The processing system of claim 1, wherein the second module is a display module configured to drive a voltage onto the second electrode when updating an image on a display.

5. The processing system of claim 1, wherein the second module drives a sequence of equalization pulses that at least partially overlap in time with the respective voltage transitions, wherein a respective voltage change of each of the equalization pulses is in a opposite direction of the respective voltage transitions.

6. The processing system of claim 1, wherein the equalization pulse decreases a settling time of the capacitive sensing signal as the capacitive sensing signal changes from a first voltage to a second voltage during the respective voltage transitions.

7. The processing system of claim 1, further comprising a display module configured to drive a voltage onto the first electrode when updating an image on a display.

8. The processing system of claim 7, further comprising:
a first integrated controller comprising the first module, the second module, and the display module.

9. The processing system of claim 7, further comprising:
a first integrated controller comprising the first module and the second module; and
a second integrated controller comprising the display module.

10. The processing system of claim 7, further comprising:
a first integrated controller comprising the first module and the display module;
a second integrated controller comprising the second module.

11. An input device comprising:
a plurality of sensor electrodes that establish a sensing region of the input device;
a processing system coupled to the plurality of sensor electrodes, the processing system is configured to:
drive a first electrode of the plurality of sensor electrodes with a capacitive sensing signal comprising a plurality of sensing cycles linked by respective voltage transitions;
drive a second electrode with an equalization pulse during at least one of the voltage transitions, wherein the second electrode is configured to perform at least one of capacitive sensing and display updating and is capacitively coupled to the first electrode, wherein the equalization pulse is out of phase with the capacitive sensing signal such that a voltage change of the equalization pulse is opposite the at least one voltage transition, and wherein a duration of the equalization pulse is less than a duration of one of the plurality of sensing cycles.

12. The input device of claim 11, wherein the second electrode is one of the plurality of sensor electrodes, and wherein the processing system is configured to receive a resulting signal used for capacitive sensing via the second electrode, the resulting signal is based on, at least in part, the capacitive sensing signal driven on the first electrode.

13. The input device of claim 11, wherein the first module is configured to measure a change in capacitance between the first electrode and earth ground.

14. The processing system of claim 11, wherein second electrode is a display electrode, wherein the processing system is configured to drive a voltage onto the second electrode when updating an image on a display.

15. The input device of claim 11, wherein the processing system is configured to drive a sequence of equalization pulses at least partially overlapping in time with each of the respective voltage transitions, wherein a respective voltage change of each of the equalization pulses is in an opposite direction of the respective voltage transitions.

16. The input device of claim 11, wherein the processing system is configured to drive a voltage onto the first electrode when updating an image on a display.

17. The input device of claim 11, wherein the first and second electrodes are arranged on a same surface.

18. The input device of claim 11, wherein the first electrode is on a different layer than the second electrode, wherein at least a portion of the first electrode overlaps the second electrode.

19. A method of performing capacitive sensing, the method comprising:
driving a capacitive sensing signal onto a first electrode, the capacitive sensing signal comprising a plurality of sensing cycles linked by respective voltage transitions;
driving an equalization pulse onto a second electrode during at least one of the voltage transitions, wherein the second electrode is configured to perform at least one of capacitive sensing and display updating and is capacitively coupled to the first electrode, wherein the equalization pulse is out of phase with the capacitive sensing signal such that a voltage change of the equalization pulse is opposite the at least one voltage transition, and wherein a duration of the equalization pulse is less than a duration of one of the plurality of sensing cycles.

20. The method of claim 19, further comprising receiving a resulting signal via a receiver electrode, the resulting signal is based on, at least in part, the capacitive sensing signal driven on the first electrode.

21. The method of claim 19, further comprising measuring a change in capacitance between the first electrode and earth ground.

* * * * *

UNITED STATES PATENT AND TRADEMARK OFFICE
CERTIFICATE OF CORRECTION

PATENT NO.        : 9,459,367 B2                                              Page 1 of 1
APPLICATION NO.   : 14/176952
DATED             : October 4, 2016
INVENTOR(S)       : Christopher A. Ludden It is certified that error appears in the above-identified patent and that said Letters Patent is hereby corrected as shown below:

In the Claims

Column 19, Line 4, Claim 1, after "one of the" please insert -- respective --;

Column 19, Line 4-6, Claim 1, after "transitions," please delete "wherein the first electrode is capacitively coupled to the second electrode via the capacitance;";

Column 19, Line 32, Claim 5, please delete "a" and insert -- an --, therefor;

Column 19, Line 52, Claim 10, after "module;" please insert -- and --, therefor;

Column 19, Line 57, Claim 11, after "device;" please insert -- and --, therefor;

Column 19, Line 63, Claim 11, after "transitions;" please insert -- and --, therefor;

Column 20, Line 2, Claim 11, after "one of the" please insert -- respective --, therefor;

Column 20, Line 17, Claim 13, please delete "first module" and insert -- processing system --, therefor;

Column 20, Line 20, Claim 14, after "wherein" please insert -- the --, therefor;

Column 20, Line 29, Claim 15, after "direction of" please insert -- a respective one of --, therefor;

Column 20, Line 43, Claim 19, after "transitions;" please insert -- and --, therefor;

Column 20, Line 45, Claim 19, after "at least one of the;" please insert -- respective --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*